United States Patent
Joo et al.

(10) Patent No.: US 9,724,640 B2
(45) Date of Patent: Aug. 8, 2017

(54) ELECTRODE-SUPPORT TYPE OF GAS-SEPARATION MEMBRANE MODULE, TUBULAR STRUCTURE OF SAME, PRODUCTION METHOD FOR TUBULAR STRUCTURE, AND HYDROCARBON REFORMING METHOD USING SAME

(71) Applicant: KOREA INSTITUTE OF ENERGY RESEARCH, Daejeon (KR)

(72) Inventors: Jong Hoon Joo, Chungcheongbuk-do (KR); Ji Haeng Yu, Daejeon (KR); Chung-Yul Yoo, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 78 days.

(21) Appl. No.: 14/410,587

(22) PCT Filed: Oct. 31, 2013

(86) PCT No.: PCT/KR2013/009780
§ 371 (c)(1),
(2) Date: Dec. 23, 2014

(87) PCT Pub. No.: WO2014/077531
PCT Pub. Date: May 22, 2014

(65) Prior Publication Data
US 2015/0328582 A1    Nov. 19, 2015

(30) Foreign Application Priority Data

Nov. 19, 2012  (KR) ........................ 10-2012-0130795
Apr. 18, 2013  (KR) ........................ 10-2013-0042781

(51) Int. Cl.
*B01D 53/22* (2006.01)
*B01D 69/02* (2006.01)
(Continued)

(52) U.S. Cl.
CPC .......... *B01D 53/228* (2013.01); *B01D 53/22* (2013.01); *B01D 53/229* (2013.01);
(Continued)

(58) Field of Classification Search
CPC .... B01D 53/22; B01D 53/228; B01D 53/229; B01D 53/323; B01D 63/061;
(Continued)

(56) References Cited

U.S. PATENT DOCUMENTS 5,106,654 A * 4/1992 Isenberg ................ B01D 71/02
                                                              427/115
5,714,091 A * 2/1998 Mazanec .............. B01D 53/228
                                                              252/373

(Continued)

FOREIGN PATENT DOCUMENTS

KR    10-2004-0089964 A    10/2004

OTHER PUBLICATIONS

Kharton et al., "Oxygen transport in Ce0.8Gd0.2O2-σ-based composite membranes", Solid State Ionics, vol. 160, pp. 247-258, (2003).

*Primary Examiner* — Jason M Greene
(74) *Attorney, Agent, or Firm* — Vorys, Sater, Seymour & Pease LLP; Mih Suhn Koh

(57) ABSTRACT

The present invention provides: an electrode-supporting type of gas-separation membrane module for selectively effecting the passage of a gas via an electron exchange reaction due to a coupling-material layer and gas exchange via an ion-conducting separation layer; a tubular structure of same; a production method for the tubular structure; and a hydrocarbon-reforming method using the gas-separation membrane module. The present invention is advantageous in that outstanding chemical and mechanical durability can be ensured by using a fluorite-based ion-conducting membrane (Continued)

US 9,724,640 B2

Page 2 which is chemically stable in CO2 and H2O atmospheres in particular, at high temperature, and in that a pure gas can be produced inexpensively since the passage of gas occurs due to an internal circuit even without applying a voltage from the outside.

13 Claims, 10 Drawing Sheets

(51) Int. Cl.
B01D 71/02 (2006.01)
B01D 63/06 (2006.01)
B01D 53/32 (2006.01)
B01D 67/00 (2006.01)
C01B 13/02 (2006.01)
C01B 3/36 (2006.01)
C01B 3/50 (2006.01)

(52) U.S. Cl.
CPC ......... B01D 53/323 (2013.01); B01D 63/061 (2013.01); B01D 67/0083 (2013.01); B01D 69/02 (2013.01); B01D 71/024 (2013.01); C01B 3/36 (2013.01); C01B 3/503 (2013.01); C01B 13/0255 (2013.01); B01D 2256/12 (2013.01); B01D 2256/16 (2013.01); B01D 2319/02 (2013.01); B01D 2323/08 (2013.01); B01D 2325/22 (2013.01); B01D 2325/24 (2013.01); B01D 2325/26 (2013.01); B01D 2325/30 (2013.01); C01B 2203/025 (2013.01); C01B 2203/1241 (2013.01); C01B 2203/1282 (2013.01)

(58) Field of Classification Search
CPC .... B01D 67/0083; B01D 69/02; B01D 69/04; B01D 71/02; B01D 71/024; B01D 2256/12; B01D 2256/16; B01D 2319/02; B01D 2319/04; C01B 3/36; C01B 3/503; C01B 13/0255; C01B 2203/025; C01B 2203/1241
See application file for complete search history.

(56) References Cited

U.S. PATENT DOCUMENTS

| 5,910,238 | A | * | 6/1999 | Cable | B01D 53/326 205/634 |
|---|---|---|---|---|---|
| 6,565,632 | B1 | | 5/2003 | Van Hassel et al. | |
| 6,887,361 | B1 | * | 5/2005 | Visco | B01D 67/0069 204/490 |
| 2004/0081878 | A1 | * | 4/2004 | Mardilovich | H01M 8/0228 429/456 |
| 2005/0061663 | A1 | * | 3/2005 | Chen | B01D 53/228 204/295 |
| 2007/0246366 | A1 | * | 10/2007 | Mordkovich | B01D 53/228 204/627 |
| 2010/0285387 | A1 | * | 11/2010 | Fujita | H01M 8/0204 429/465 |
| 2016/0096151 | A1 | * | 4/2016 | Serra | B01D 53/228 585/661 |

* cited by examiner

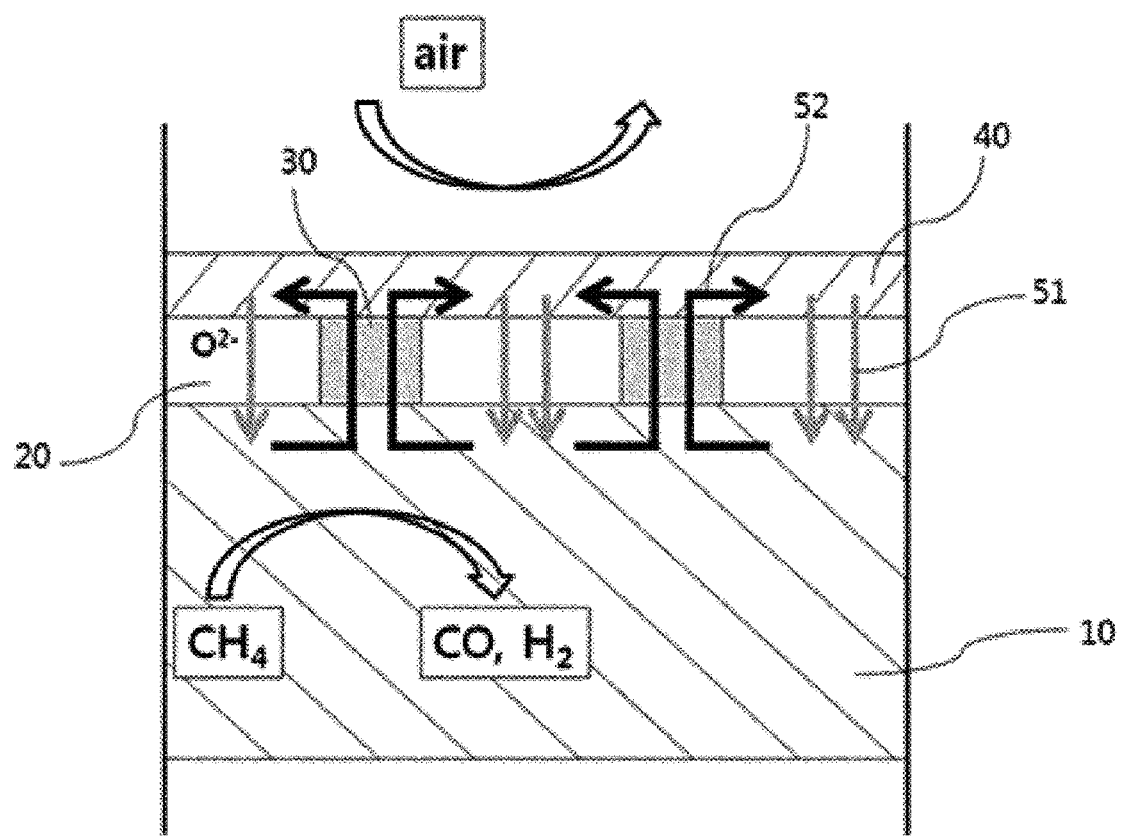

ELECTRODE-SUPPORT TYPE OF GAS-SEPARATION MEMBRANE MODULE, TUBULAR STRUCTURE OF SAME, PRODUCTION METHOD FOR TUBULAR STRUCTURE, AND HYDROCARBON REFORMING METHOD USING SAME

BACKGROUND OF THE INVENTION

Field of the Invention

The present disclosure relates to a gas-separation membrane, particularly electrode-supporting type gas-separation membrane module based on ion transport ceramic membrane, its tubular structure and a hydrocarbon reforming method using the same.

Description of the Related Art

Ceramic separation membranes used for gas transport are largely divided into pure oxygen ion conducting membranes and mixed ionic-electronic conducting (MIEC) membranes. The former requires an external power source and electrodes to provide the electric current, and driven by the electrical potential gradient the gas transport is precisely controlled in quantity by applying the electric current supplied and the gas is able to be pumped in either direction regardless of the oxygen partial pressure gradient. In contrast, the latter MIEC membranes are able to transport ionized gas and electrons without electrodes and external power source driven by oxygen pressure gradients. The MIEC membranes consist of one single phase capable of both ionic and electronic conduction or dual phases with one metal (or perovskite) phase for electronic conduction and the other phase from fluorite structures for ionic conduction.

Perovskite comprised in MIEC membranes as described above is chemically unstable because the perovskite structures become destroyed in the presence of acidic or reducing gases such as $CO_2$, $H_2S$, $H_2O$, $CH_4$ etc. by the reaction between the gases and perovskite oxides. Namely, it is hard to use most of the mixed conductive oxides in an actual application process because they are broken down into carbonate or hydroxide in the atmosphere containing $CO_2$, or $H_2O$.

The dual phase MIEC membranes have fluorite oxides which have high chemical stability against acidic or reducing gases as described above. The MIEC membranes were prepared by combining the metal phase selected from Ag, Pd, Au or Pt and the like and the ion conducting phase selected from yttria-stabilized zirconia (YSZ), scandia-stabilized zirconia (ScSZ), Sm doped-Ceria (SDC), or Gd doped-ceria (GDC), $LaGaO_3$ and the like. The metal phase and ion conducting phase requires a continuous material pathway leading to a high material cost for preparation. Further it has an issue with the conductivity leading to the lower ionized gas permeation fluxes.

Also among MIEC films, a composite of electro-conductive oxide (for example perovskite type or spinel type) and fluorite structure or fluorite phase having ion conducting properties is essential for preparing a dense composite type separation membrane. However the reaction between the two types of materials during the sintering process results in a lower ionic transport rates. Namely, that is due to the formation of an insulating layer at the interface during the sintering process (Kharton et al., Oxygen transport in $Ce_{0.8}Gd_{0.2}O_2$-d-based composite membranes, Solid State Ionics, 160 (2003), 247).

Therefore, there are needs to develop a separation membrane having a balance between the chemical stability and ionized gas flux. Thus ion conducting ceramic membrane having an external short circuit has been developed, which is consist of a fluorite phase with a dense structure and a porous metal phase that is coated on the surface of the fluorite phase membrane. The two sides of the coated metal layers are connected by external wires and ionized gas conduction through the ceramic separation membrane and electronic conduction (Galvanic method) through the external wire resulted in a short circuit membrane. Silver paste is usually used to seal the ceramic membranes between the two different gas chambers.

The external wires are no longer required if the electronic conduction can be realized via the silver sealing as long as the silver sealing touches the coated porous metal layers. However, the separation membrane with an external short circuit that is based on an ion transport ceramic support has a limitation in preparing them into more thin membranes. Also the scale up of the membrane leads to a longer electronic conduction path and the increased resistance resulting in the lower conductivity. Also this suffers from the high cost of preparing the membrane due to the use of precious metals such as Ag, Pt, and Au for conductive sealing. Thus, there are needs to develop a short circuit membrane which can be scaled up with a reduced thickness and be prepared in a low cost.

KR patent publication 2004-0089964 relates to an oxygen transport separation membrane and discloses an oxygen transport separation membrane and a method for reforming the surface thereof to improve oxygen flux rate, which is composed of mixed conductive perovskite capable of conducting electrons and oxygen ions.

Meanwhile, currently there are no reports regarding tubular modulization of short circuit membranes. Further in configuring a module, the previous art is based on the planar structure and the galvanic method suffers from a high cost for membrane preparation due to the applied voltage required.

U.S. Pat. No. 6,565,632 relates to ion transport membrane assembly incorporation internal support and discloses a tubular membrane. However it suffers from the problem that the area of the membrane per volume is small thus increasing the cost of fabricating the membrane when it is scaled up to fabricate the module having a large capacity. Thus there are needs to develop a module with a compact structure.

DETAILED DESCRIPTION OF THE INVENTION

Problems to be Solved

To solve the problems above the present disclosure is to provide a gas separation membrane module of electrode support type which is capable of selectively transport gases via exchange reaction of electrons by continuous path layer and exchange of gases through the ion conductive separation membrane, the tubular form thereof, the method for preparing the tubular form and method for reforming hydrocarbon using the gas separation module.

SUMMARY OF THE INVENTION

The present disclosure is based on the findings that the short circuit separation membranes can be configured as a module, or a tubular structure thereof, which comprises a plurality of separation membranes each of which are separated from each other by at least one of conductive membrane (metal or conductive ceramic layer with a dense structure) through which electrons are transported, and the efficient gas separation method and reforming method using the same can be achieved.

Thus in one aspect, it is provide that an electrode-supporting type gas-separation membrane module comprising: a porous support; a plurality of gas-separation membranes positioned in contact with and on top of the porous support, the membranes being positioned adjacent to each other and separated from each other by at least one interconnecting portion, which is interposed between the gas-separation membranes abutting or touching the gas-separation membranes; and a porous electrode active layer positioned in contact with and on the top of the gas-separation membranes and the interconnecting portion.

Also provided is the module, wherein the porous support is a metal, a cermet or an electro-conductive metal oxide, the metal is selected from the group consisting of Ni, Ni-alloy and Fe-base alloy, the electro-conductive metal oxide is selected from the group consisting of Lanthanum strontium ferrite (LSF), Lanthanum strontium Manganite (LSM), Lanthanum strontium Chromite (LSCr), Lanthanum strontium cobalt ferrite (LSCF) which are a Perovskite type, MnFe2O4, and NiFe2O4, which are a spinel type.

Also provided is the module, wherein the cermet is a composite of an ion conductive electrolyte material and one selected from the group consisting of Ni, Ni-alloy, or Fe-base alloy, the ion conductive electrolyte is at least one material selected from the group consisting of yttria-stabilized zirconia (YSZ), scandia-stabilized zirconia (ScSZ), Gd doped-ceria (GDC), Sm doped-Ceria, Lanthanum gallates, SrCeO3, BaCeO3, BaZrO3, CaZrO3, SrZrO3, La2Zr2O7, and La2Ce2O7, wherein the gas membrane is made of the same material as the ion conductive electrolyte comprised in the cermet.

Also provided is the module, wherein the gas separation membrane is for separating oxygen or hydrogen, the oxygen separating membrane is made of yttria-stabilized zirconia (YSZ), scandia-stabilized zirconia (ScSZ), Gd doped-ceria (GDC), Sm doped-Ceria, or Lanthanum gallates, the hydrogen separation membrane is made of SrCeO3, BaCeO3, BaZrO3, CaZrO3, or SrZrO3, which are a Perovskite type, or La2Zr2O7, La2Ce2O7 which are a Pyrochlore type.

Also provided is the module, wherein the interconnecting portion is a metal or an electro-conductive metal oxide of a dense structure, the metal is Ag, Pd, Au, or Pt, the electro-conductive metal oxide is Lanthanum strontium ferrite (LSF), Lanthanum strontium Manganite (LSM), Lanthanum strontium Chromite (LSCr), or Lanthanum strontium cobalt ferrite (LSCF) which are a Perovskite type, or MnFe2O4, or NiFe2O4 which are a spinel type.

Also provided is the module, wherein the porous electrode active layer is a porous metal, a cermet or an electro-conductive metal oxide; the porous metal is Ni, Ni-alloy, or Fe-base alloy; the electro-conductive metal oxide is Lanthanum strontium ferrite (LSF), Lanthanum strontium Manganite (LSM), Lanthanum strontium Chromite (LSCr), Lanthanum strontium cobalt ferrite (LSCF) which are a Perovskite type, or MnFe2O4, or NiFe2O4 which are a spinel type.

Also provided is the module, wherein the cermet is a composite of a material selected from Ni, Ni-alloy, and Fe-base alloy and an ion transport electrolyte; the ion transport electrolyte is at least one material selected from the group consisting of yttria-stabilized zirconia (YSZ), scandia-stabilized zirconia (ScSZ), Gd doped-ceria (GDC), Sm doped-Ceria, Lanthanum gallates, SrCeO3, BaCeO3, BaZrO3, CaZrO3, SrZrO3, La2Zr2O7, and La2Ce2O7; wherein the gas membrane is made of the same material as the ion transport electrolyte comprised in the cermet.

In other aspect, the present disclosure provides a method for reforming hydrocarbon using a device comprising the module according to the present disclosure, wherein the device comprises a first and a second space which are defined by the membrane module interposed between the spaces and the porous support comprised in the module is made of cermet, Lanthanum strontium chromit (LSCr) or Lanthanum strontium titanate (LSTi), the method comprising: providing a hydrocarbon type fuel gas maintaining at the temperature of 500° C. to 900° C. to the first space such that the gas touches the one side of the membrane module, obtaining the synthetic gas from the first and second space or the first space.

Also provided is the reforming hydrocarbon method, which further comprises before the obtaining step a step of supplying an air at 1 to 10 air pressure to the second space such that the gas touches the other side of the membrane module.

Also provided is the reforming hydrocarbon method, wherein the hydrocarbon is a methane gas (CH4), and the synthetic gas is a mixture of $H_2$ and CO Also provided is the reforming hydrocarbon method, wherein the hydrocarbon is a methane gas comprising CO and H2, the synthetic gas obtained from the first space is CO and the synthetic gas obtained from the second space is H2.

In other aspect, the present disclosure provides a tubular module of electrode-supporting type gas-separation membrane comprising a tubular porous conductive support; a plurality of gas-separation membranes positioned in contact with and on top of the tubular porous conductive support along the length of the support, the membranes being positioned adjacent to each other; at least one interconnecting portion interposed between the gas-separation membranes in contact with the gas-separation membranes; a porous electrode active layer positioned in contact with and on the top of the gas-separation membranes and the interconnecting portion.

Also provided is the tubular module, wherein the tubular porous conductive support is a metal, a cermet, or an electro-conductive metal oxide, the metal is Ni, Ni-alloy, or Fe-base alloy, the electro-conductive metal oxide is Lanthanum strontium ferrite (LSF), Lanthanum strontium Manganite (LSM), Lanthanum strontium Chromite (LSCr), or Lanthanum strontium cobalt ferrite (LSCF), which are a Perovskite type, or MnFe2O4 or NiFe2O4, which are a spinel type.

Also provided is the tubular module, wherein the cermet is a composite of one of Ni, Ni-alloy or Fe-base alloy and an ion transport electrolyte, the ion transport electrolyte is at least one of yttria-stabilized zirconia (YSZ), scandia-stabilized zirconia (ScSZ), Gd doped-ceria (GDC), Sm doped-Ceria, Lanthanum gallates, SrCeO3, BaCeO3, BaZrO3, CaZrO3, SrZrO3, La2Zr2O7, and La2Ce2O7, the gas membrane is made of the same material as the ion transport electrolyte comprised in the cermet.

Also provided is the tubular module, wherein the gas separation membrane is for separating oxygen or hydrogen, the oxygen separating membrane is made of yttria-stabilized zirconia (YSZ), scandia-stabilized zirconia (ScSZ), Gd doped-ceria (GDC), Sm doped-Ceria, or Lanthanum gallates, the hydrogen separation membrane is made of SrCeO3, BaCeO3, BaZrO3, CaZrO3, or SrZrO3, which are a Perovskite type, or La2Zr2O7, or La2Ce2O7 which are a pyrochlore type.

Also provided is the tubular module, wherein the interconnecting portion is a metal or an electro-conductive metal oxide having a dense structure, the metal is Ag, Pd, Au, or Pt, the electro-conductive metal oxide is Lanthanum strontium ferrite (LSF), Lanthanum strontium Manganite (LSM), Lanthanum strontium Chromite (LSCr), or Lanthanum strontium cobalt ferrite (LSCF), which are a perovskite type, or $MnFe_2O_4$, or $NiFe_2O_4$, which are a spinel type.

Also provided is the tubular module, wherein the porous electrode active layer is a porous metal, a cermet or an electro-conductive metal oxide; the porous metal is Ni, Ni-alloy, or Fe-base alloy; the electro-conductive metal oxide is Lanthanum strontium ferrite (LSF), Lanthanum strontium Manganite (LSM), Lanthanum strontium Chromite (LSCr), Lanthanum strontium cobalt ferrite (LSCF), which are a perovskite type, or $MnFe_2O_4$, or $NiFe_2O_4$ which are a spinel type.

Also provided is the tubular module, wherein the cermet is a composite of one of Ni, Ni-alloy and Fe-base alloy and an ion transport electrolyte, the ion transport electrolyte is at least one of yttria-stabilized zirconia (YSZ), scandia-stabilized zirconia (ScSZ), Gd doped-ceria (GDC), Sm doped-Ceria, Lanthanum gallates, $SrCeO_3$, $BaCeO_3$, $BaZrO_3$, $CaZrO_3$, $SrZrO_3$, $La_2Zr_2O_7$, and $La_2Ce_2O_7$, the gas membrane is made of the same material as the ion transport electrolyte comprised in the cermet.

In other aspect, the present disclosure provides a method for fabricating the tubular module of electrode-supporting type gas-separation membrane according to the present disclosure, comprising preparing a tubular porous conductive support having a flow path formed therein through which a gas transported into the support is able to move and collected, the tubular support being prepared by an ejaculation process; coating the outer surface of the tubular support with a gas-separation membrane wherein the outer surface being masked in areas that is to be coated with a interconnecting portion prior to the coating, exposing the masked area and coating the unmasked areas with the interconnecting portion; heat treating the tubular support coated with the gas separation membrane and the interconnecting portion at 1200 to 1600° C.; and coating the surface of the gas separation membrane and the interconnecting portion with a porous electrode active layer Also provided is a method, wherein the tubular porous conductive support is a metal, a cermet, or an electro-conductive metal oxide, the metal is Ni, Ni-alloy or Fe-base alloy, the electro-conductive metal oxide is Lanthanum strontium ferrite (LSF), Lanthanum strontium Manganite (LSM), Lanthanum strontium Chromite (LSCr), Lanthanum strontium cobalt ferrite (LSCF), which are a perovskite type, or $MnFe_2O_4$, or $NiFe_2O_4$, which are a spinel type of oxide.

Also provided is a method, wherein the cermet is a composite of one of Ni, Ni-alloy and Fe-base alloy and an ion transport electrolyte, the ion transport electrolyte is at least one of yttria-stabilized zirconia (YSZ), scandia-stabilized zirconia (ScSZ), Gd doped-ceria (GDC), Sm doped-Ceria, Lanthanum gallates, $SrCeO_3$, $BaCeO_3$, $BaZrO_3$, $CaZrO_3$, $SrZrO_3$, $La_2Zr_2O_7$, and $La_2Ce_2O_7$, the gas membrane is made of the same material as the ion transport electrolyte comprised in the cermet.

Also provided is a method, wherein the gas separation membrane is for separating oxygen or hydrogen, the oxygen separating membrane is made of yttria-stabilized zirconia (YSZ), scandia-stabilized zirconia (ScSZ), Gd doped-ceria (GDC), Sm doped-Ceria, or Lanthanum gallates, the hydrogen separation membrane is made of $SrCeO_3$, $BaCeO_3$, $BaZrO_3$, $CaZrO_3$, or $SrZrO_3$, which are a Perovskite type, or $La_2Zr_2O_7$, or $La_2Ce_2O_7$ which are a pyrochlore type.

Also provided is a method, wherein the interconnecting portion is a metal or an electro-conductive metal oxide having a dense structure, the metal is Ag, Pd, Au, or Pt, the electro-conductive metal oxide is Lanthanum strontium ferrite (LSF), Lanthanum strontium Manganite (LSM), Lanthanum strontium Chromite (LSCr), or Lanthanum strontium cobalt ferrite (LSCF), which are a perovskite type, or $MnFe_2O_4$, or $NiFe_2O_4$, which are a spinel type oxide.

Also provided is a method, wherein the porous electrode active layer is a porous metal, a cermet or an electro-conductive metal oxide; the porous metal is Ni, Ni-alloy, or Fe-base alloy; the electro-conductive metal oxide is Lanthanum strontium ferrite (LSF), Lanthanum strontium Manganite (LSM), Lanthanum strontium Chromite (LSCr), Lanthanum strontium cobalt ferrite (LSCF), which are a perovskite type, or $MnFe_2O_4$, or $NiFe_2O_4$ which are a spinel type oxide.

Also provided is the method, wherein the cermet is a composite of one of Ni, Ni-alloy and Fe-base alloy and an ion transport electrolyte, the ion transport electrolyte is at least one of yttria-stabilized zirconia (YSZ), scandia-stabilized zirconia (ScSZ), Gd doped-ceria (GDC), Sm doped-Ceria, Lanthanum gallates, $SrCeO_3$, $BaCeO_3$, $BaZrO_3$, $CaZrO_3$, $SrZrO_3$, $La_2Zr_2O_7$, and $La_2Ce_2O_7$, the gas membrane is made of the same material as the ion transport electrolyte comprised in the cermet.

In other aspect, the present disclosure provides a method for reforming hydrocarbon using a device comprising the tubular module according to the present disclosure, wherein the porous conductive support is made of cermet, Lanthanum strontium chromit (LSCr) or Lanthanum strontium titanate (LSTi), the method comprising providing a hydrocarbon type fuel gas maintaining a temperature at 500° C. to 900° C. to the inside of the tubular module of the device such that the gas provided is in contact with the surface inside of the tubular module; and obtaining the synthetic gas from the outside and inside of the tubular module or the inside of the tubular module.

Also provided is the method which further comprises a step before the obtaining step, supplying an air at 1 to 10 air pressure to the outside of the device such that the air provided is in contact with the surface outside of the module.

Advantageous Effects

The present module, tubular module and methods of making and using the same can be used advantageously to produce a pure gas with a low cost by incorporating a chemically stable fluorite type ion transport membrane at a high temperature, particular in an atmosphere containing $CO_2$, $H_2O$, which is able to transport gases by the internal circuit without applying the external voltage and resulted in a device having a superior chemical and mechanical durability. By embodying a short circuit conductive membrane in the form of electrode-supporting type gas-separation membrane module, the efficiency of gas separation was maximized leading to reforming hydrocarbons. Also by stacking membranes of a tubular structure, it is possible to fabricate a separation membrane module for gas preparation in a compact size. Further, by controlling the space or width and the like of interconnecting layers, it is possible to easily change the electron conductivity in the transport module and thus the optimized condition may be found to maximize the gas permeability.

Also, in the present disclosure, the support for the separation membrane is made of cermet, Lanthanum strontium chromit (LSCr) or Lanthanum strontium titanate (LSTi), which is able to use both the catalytic property for hydrocarbon by metal component and the mechanical property by the ceramic component and thus leads to the stable reforming of hydrocarbons.

BRIEF DESCRIPTION OF THE DRAWINGS

FIG. 4 is a schematic representation of a process for reforming methane gas using an electrode-supporting type gas-separation membrane module incorporating the present oxygen separation membrane according to one embodiment.

DETAILED DESCRIPTION OF THE EMBODIMENT

While embodiments of the present invention are shown and described throughout the present disclosure, it would be appreciated by those skilled in the art that changes may be made in this embodiment without departing the principles and spirit of the invention, the scope of which is defined by the appended claims and their equivalents.

In one aspect, the present disclosure relates to a gas-separation membrane module comprising a porous support; a plurality of gas-separation membranes positioned in contact with and on the top of the porous support, the membranes being positioned adjacent to each other; at least one interconnecting portion interposed between the gas-separation membranes and abutting or in contact with the gas-separation membrane; a porous electrode active layer positioned in contact with and on the top of the gas-separation membranes and the interconnecting portion.

The separation membrane refers to an interface which is able to selectively limiting or controlling the transport of a material between two phases. The separation process has become an important research subject covering from industrial field such as chemical industry, food industry, and reagent industry to a medical treatment and biochemistry fields since highly pure and high quality products are required in an era of advanced and diversified industry.

Figure 1:
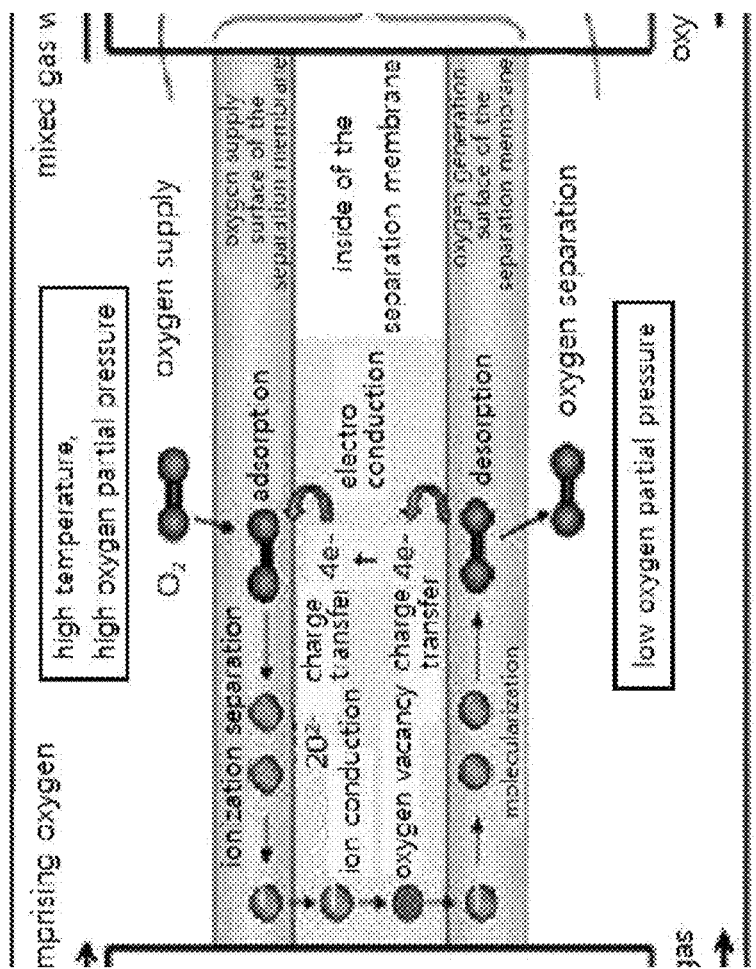
FIG. 1 is a schematic representation of an oxygen separation process using an ion transport separation membrane.

FIG. 1 is a schematic representation of an oxygen separation process using the conventional a perovskite type ion transport separation membrane in which oxygen is anionized at the air feed side and transported to the other side through the ion transport separation membrane while electrons move in the opposite direction. However the conventional ion transport separation membrane requires a high pressure and temperature as energy for the separation. Mixed gas containing oxygen is ionized at the condition of high temperature and pressure and the ionized oxygen permeates through the membrane after which electrons are released as ionized oxygen becomes oxygen molecule while electrons move in the opposite direction.

Figure 2:
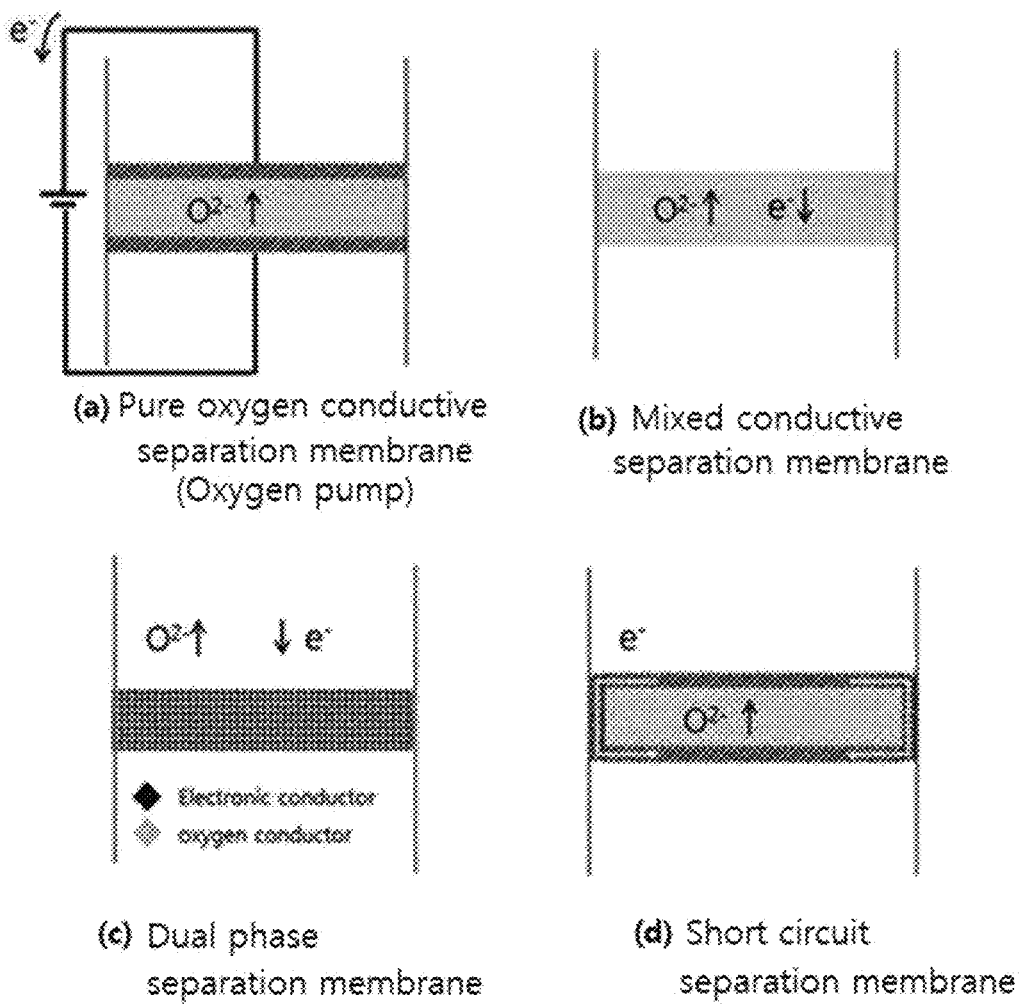
FIG. 2 are schematic diagrams in which (a) is a pure oxygen conductive separation membrane equipped with an external power source; (b) is a mixed conductive separation membrane, and (c) is a dual phase separation membrane, and (d) is a short circuit separation membrane.

FIG. 2 shows various forms of oxygen separation membrane structure in which the mode of electron and ion transport, particularly electron transport is represented. In FIG. 2, (a) is a pure oxygen conductive separation membrane that requires an electrode and an external power source for electric current supply, in which oxygen ion flux is precisely controlled by the electric current supplied, and oxygen is able to be pumped in either direction regardless of the oxygen partial pressure gradient present in both side of the membrane. In FIG. 2, (b) shows a perovskite single phase mixed ionic-electronic conducting (MIEC) membrane that is able to transport both oxygen ion and electrons. In FIG. 2, (c) shows a dual phase mixed ionic-electronic conducting (MIEC) membrane in which each of electrons and oxygen ion is transported through a separate phases. In FIG. 2, (d) shows an ion transport ceramic separation membrane of equipped with short circuit to meet the balance between the chemical stability and ionized oxygen flux.

However the conventional membrane (d) uses ion transport separation membrane support and thus there is a limitation in preparing them into thin supports (generally 300-1 mm) leading to a low oxygen transport rate. Further it requires metals as a sealing material such as Ag, Pt, and Au leading to a high manufacturing cost. Also when the membranes are scaled up in a large size, the elongated electron conduction path leads to an increased resistance which makes it hard to obtain a higher conductivity. While he present disclosure relates to an electrode-supporting type gas-separation membrane module for gas, particularly oxygen separation employing short circuit separation membrane as depicted in (d) of FIG. 2, the present module/membrane is able to be prepared in a thin and a scale up in large size yet compact structure.

In one embodiment of the present disclosure, the gas-separation membrane is a membrane to separate oxygen or hydrogen. The oxygen separation membrane is made of at least one material selected from the group consisting of yttria-stabilized zirconia (YSZ), scandia-stabilized zirconia (ScSZ) and Gd doped-ceria (GDC), Sm doped-Ceria, Lanthanum gallates. The hydrogen separation membrane is made of at least one material from Perovskite type including $SrCeO_3$, $BaCeO_3$, $BaZrO_3$, $CaZrO_3$, and $SrZrO_3$, or from Pyrochlore type including $La_2Zr_2O_7$, and $La_2Ce_2O_7$. In one embodiment, the porous electrode support employed in the present disclosure is a porous metal, cermet, or electro-conductive oxide (for example, perovskite type or spinel (spinel) type materials). The porous metal is selected from Ni, Ni-alloy, and Fe-base alloy. Also, the electro-conductive metal oxide includes Lanthanum strontium ferrite (LSF), Lanthanum strontium Manganite (LSM), Lanthanum strontium Chromite (LSCr), yttria-stabilized zirconia (YSZ)-NiO composite and Lanthanum strontium cobalt ferrite (LSCF) and the like, the use of which can lead to a high porosity and outstanding compression strength.

In one embodiment, the cermet is a composite of one of Ni, Ni-alloy and Fe-base alloy, and an ion transport electrolyte material. The ion transport electrolyte materials is at least one material selected from yttria-stabilized zirconia (YSZ), scandia-stabilized zirconia (ScSZ), Gd doped-ceria (GDC), Sm doped-Ceria, Lanthanum gallates, $SrCeO_3$, $BaCeO_3$, $BaZrO_3$, $CaZrO_3$, $SrZrO_3$, $La_2Zr_2O_7$, and $La_2Ce_2O_7$. The ion transport electrolyte included in the cermet is the same material as used for preparing the gas-separation membrane. In one embodiment, the cermet has a dense structure through a sintering process of preparing the composite which is performed at a high temperature of 1200° C. to 1500° C.

In one embodiment, the interconnecting portion is made of metal, or electro-conductive metal oxide of dense structure. In one embodiment, the metal is Ag, Pd, Au, or Pt, and the porous electrode active layer formed or positioned on the oxygen separation membrane and interconnecting portion is electrically connected to the support via interconnecting portion The porous electrode active layer is made of porous metal, cermet or electro-conductive metal oxide with a porous structure. The porous metal is Ni, Ni-alloy, or Fe-base alloy. The interconnecting portion and the electro-conductive metal oxide of the electrode active layer is at least one material selected from Lanthanum strontium ferrite (LSF), Lanthanum strontium Manganite (LSM), Lanthanum strontium Chromite (LSCr), and Lanthanum strontium cobalt ferrite (LSCF), which are a Perovskite type, and $MnFe_2O_4$ and $NiFe_2O_4$ which are a spinel oxide. The cermet is a composite of one of Ni, Ni-alloy, and Fe-base alloy and an ion transport electrolyte material(s). The ion transport electrolyte material is at least one material selected from yttria-stabilized zirconia (YSZ), scandia-stabilized zirconia (ScSZ), Gd doped-ceria (GDC), Sm doped-Ceria, Lanthanum gallates, $SrCeO_3$, $BaCeO_3$, $BaZrO_3$, $CaZrO_3$, $SrZrO_3$, $La_2Zr_2O_7$, and $La_2Ce_2O_7$. The gas membrane is made of the same material as the ion transport electrolyte material comprised in the cermet. In one embodiment, the sintering is performed at 1200 to 1500° C. for the formation of dense structure.

Figure 3A:
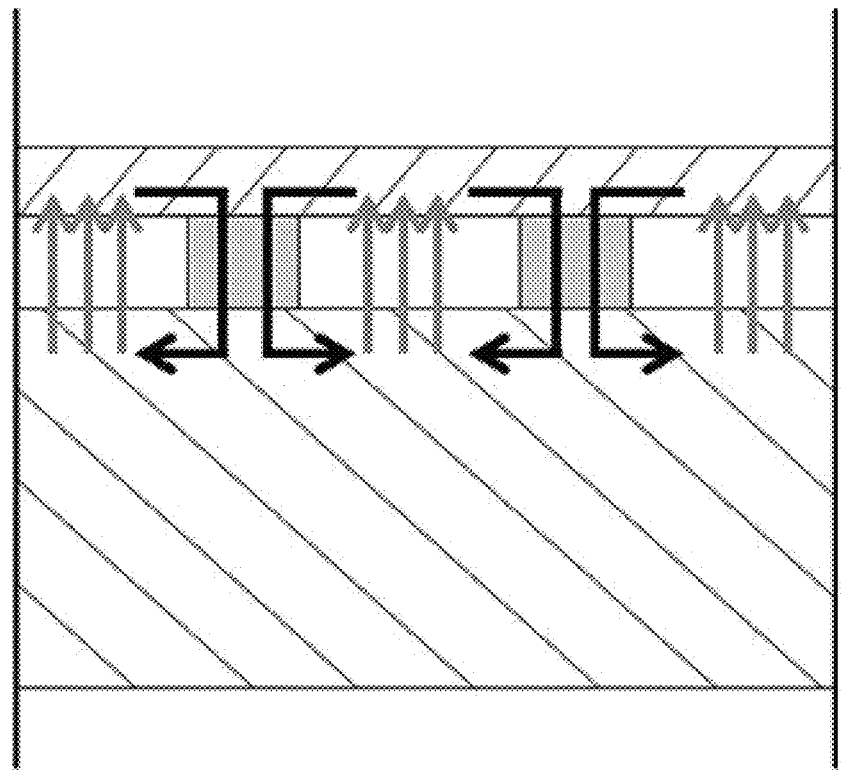
FIG. 3A is a cross sectional view of the present oxygen separation electrode-supporting type gas-separation membrane module according to one embodiment.

FIG. 3A is a cross sectional view of the present electrode-supporting type gas-separation membrane module for oxygen separation.

The porous electrode support forms a frame of the module and provides a flow path and connects at least two unit module so that it is made of electro-conductive materials.

The oxygen ion is transported through the oxygen separation membrane in an anionized form moving in a direction from a high oxygen partial pressure to a low oxygen partial pressure while the electrons moves in the opposite direction through the interconnecting portion between the porous electrode support and porous electrode active layer. When the mixture of gas containing oxygen is feed from the lower side, the gas mixture permeates the oxygen separation membrane through the porous electrode support and the oxygen becomes ionized by gaining electrons in the membrane. The oxygen ions are then released from the membrane to reach the porous electrode active layer where the oxygen ion releases electrons which are then moves in the opposite direction through the interconnecting portion from to the porous electrode active layer to the porous electrode support.

In one embodiment, the gas mixture is a synthetic gas comprising 300~500 ppm of $CO_2$, an ambient air, or a process gas.

The separation of oxygen as described above occurs in a unit electrode-supporting type gas-separation membrane module and by connecting two or more such unit electrode-supporting type gas-separation membrane modules to each other, the total area of the membrane may become increased.

Figure 3B:
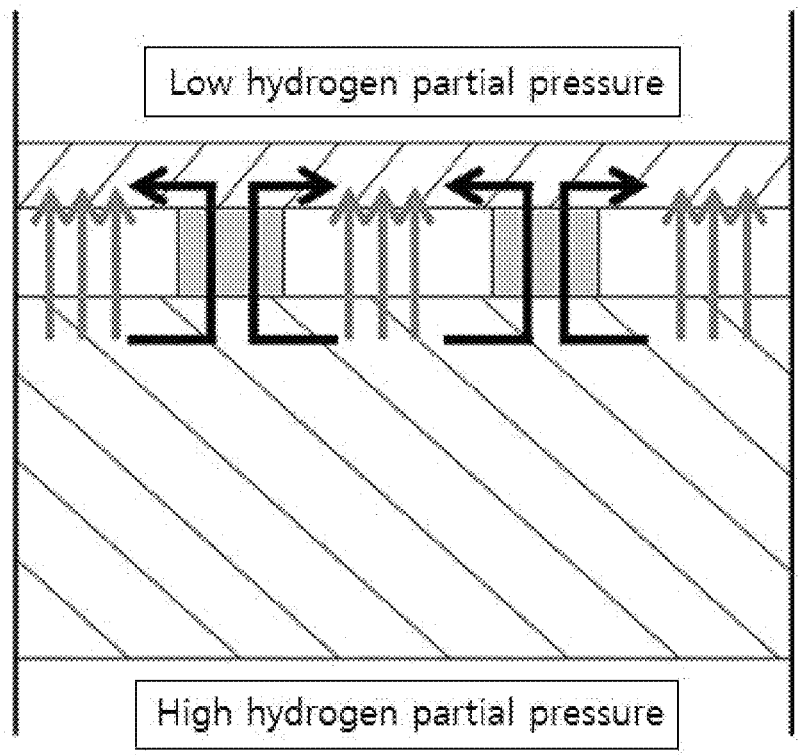
FIG. 3B is a cross sectional view of the present hydrogen separation electrode-supporting type gas-separation membrane module according to one embodiment.

FIG. 3B is a cross sectional view of the present hydrogen separation electrode-supporting type gas-separation membrane module according to one embodiment.

The hydrogen ion is transported through the hydrogen separation membrane in an ionized form moving in a direction from a high hydrogen partial pressure to a low hydrogen partial pressure and the electrons moves in the same direction through the interconnecting portion between the porous electrode support and porous electrode active layer. When the mixture of gas containing hydrogen is feed from the lower side, the gas mixture permeates the hydrogen separation membrane through the porous electrode support and the hydrogen becomes ionized by releasing electrons in the membrane. The hydrogen ions permeate the hydrogen separation membrane and reach the porous electrode active layer where they gain electrons which are reached the porous electrode active layer through the interconnecting portion and released as gas. The separation of hydrogen as described above occurs in a unit electrode-supporting type gas-separation membrane module and by connecting two or more such unit electrode-supporting type gas-separation membrane modules to each other, the total area of the membrane may become increased.

In other aspect the present disclosure relates to a method for reforming hydrocarbon using the present electrode-supporting type gas-separation membrane module. The methods are performed using a device comprising the present module, wherein the device comprises a first and a second space which are defined by the membrane module which is interposed between the two spaces and the porous support comprised in the module is made up of cermet, Lanthanum strontium chromit (LSCr) or Lanthanum strontium titanate (LSTi), The method comprises a step of providing a hydrocarbon type fuel gas at a temperature of 500° C. to 900° C. to the first space such that the gas is in contact with or touches one surface of the module; a step of obtaining the synthetic gas from the first and second space or the first space.

FIG. 4 is a schematic representation of a process for reforming methane gas using an electrode-supporting type gas-separation membrane module incorporating the present oxygen separation membrane according to one embodiment. The support (10) that is made of one material selected from cermet, Lanthanum strontium chromit (LSCr) and Lanthanum strontium titanate (LSTi) is positioned on and in contact with one surface of the oxygen separation membrane (20). The porous electrode active layer (40) is positioned on and in contact with the other surface of the oxygen separation membrane (20). Also the oxygen separation membrane is configured as a plurality of unit separation membrane, each of which is connected via interconnecting portion (30) by which the support layer and the porous electrode active layer electrically connected.

In one embodiment, the porous support layer is made of one material selected from cermet, Lanthanum strontium chromit (LSCr) and Lanthanum strontium titanate (LSTi) and the cermet is a porous composite of an ion conductive electrolyte and a metal oxide such as NiO-YSZ, NiO-GDC, NiO-SDC, NiO—CeO and the like prepared using pressing or extrusion process. To prepare the porous support, carbon powder, flour, corn flour, or starch and the like may be added as a porous forming material which is able to form a porous by being combusted during a heat treatment process. The ion transport separation membrane layer such as YSZ, doped-$CeO_2$ is coated on the support and the area which is to be coated with interconnecting portion is masked beforehand. The coating may be performed by dip-coating, screen print, CVD and the like. For coating with the electro-conductive interconnecting portion having a dense structure, the masked areas are unmasked and coated with the electro-conductive interconnecting portion such as $(La,Sr)MnO_3$, $(La,Sr)FeO_3$ and heat treated at 1200 to 1600° C. to produce a dense electrolyte layer.

As a porous electrode active layer, the electro-conductive catalytic layer is used to produce an ionization reaction $(O_2+4e^-2O^{2-})$ of oxygen molecule at the surface of the membrane and the porous structure is used to diffuse oxygen gas to the surface of electrolyte and ionize.

In one embodiment, the hydrocarbon type fuel gas is methane ($CH_4$) and provided at air pressure. The hydrocarbon type fuel gas is a reducing gas and thus induces a gradient of oxygen partial pressure which drives an oxygen transport from the electrode. Therefore, oxygen transport the separation membrane (51) and electron flows through the interconnecting portion from porous electrode active layer to the support layer (52). When hydrocarbons are reformed using the separation membrane, oxygen is released from the air provided to the second space and nitrogen remains. Here, the electric energy is not used which leads to a low manufacturing cost of synthetic gas (example: $H_2$+CO) by reforming the hydrocarbon type fuel gas. The synthetic gas produced may be collected from the first space by methods known in the art.

Figure 5:
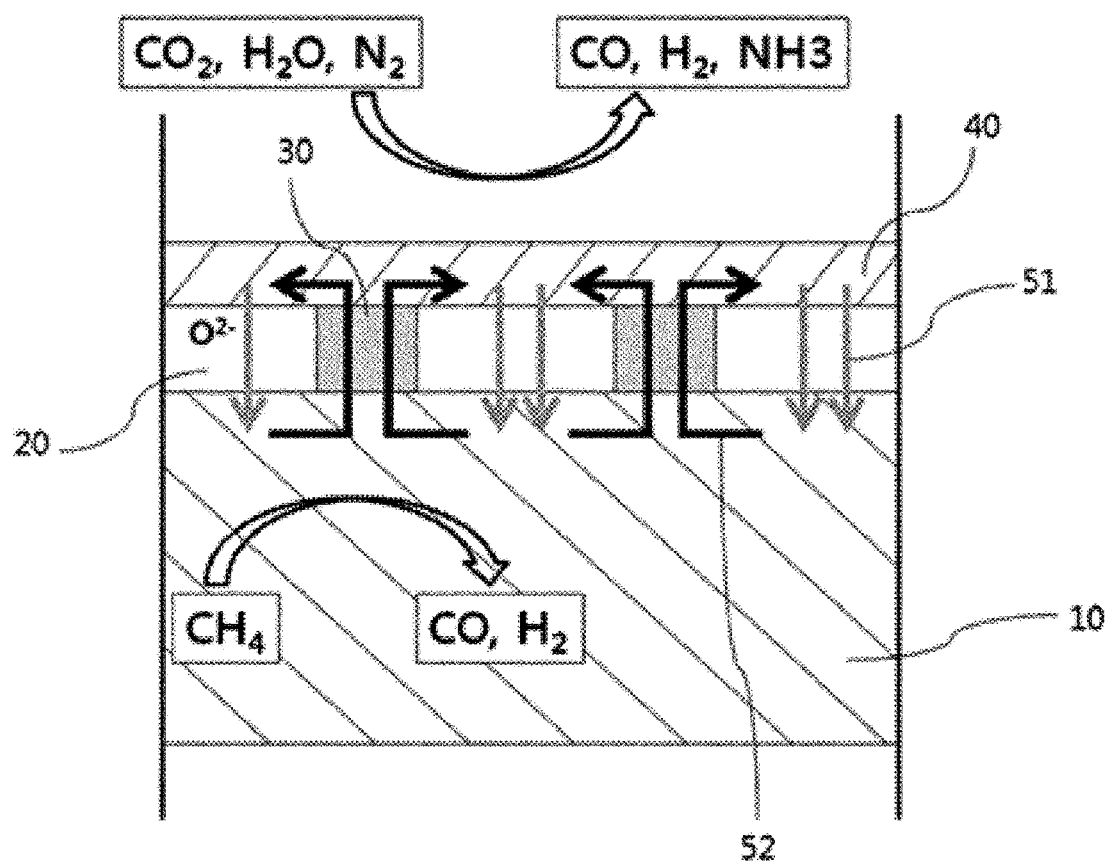
FIG. 5 is a schematic representation of multi-component coupling reactions using an electrode-supporting type gas-separation membrane module incorporating the present oxygen separation membrane according to one embodiment.

FIG. 5 is a schematic representation of multi-component coupling reactions using an electrode-supporting type gas-separation membrane module incorporating the present oxygen separation membrane according to one embodiment. When reforming hydrocarbon using the present gas-separation membrane module, the gas such as $CO_2$, $H_2O$, $N_2$ and the like is provided to the electrode at the opposite side of the support and oxygen is released. By the oxygen release, the reducing gas such as CO, $H_2$, $NH_3$ and the like is produced at the other side of the electrode. The conventional separation membrane using mixed conductive materials or a composite of ion and proton transport oxide is decomposed at the reducing gas atmosphere or undergoes a phase change and thus cannot be performed at the condition described as above.

In one embodiment, reforming hydrocarbon using the present oxygen separation membrane module and preparing ammonia are performed at 500 to 900° C. (the temperature of the space in which the separation membrane module is present) and the pressure of the vapor and nitrogen provided is air pressure to 10 atm, in which methane is provided at air pressure. The prepared ammonia may be collected using methods known in the art.

The fuel gas, methane used in reforming hydrocarbon using the separation membrane module is a reducing gas and thus induces a gradient of oxygen partial pressure, which is a driven force of oxygen transport from the opposite electrode. When reforming natural gas using the separation membrane module, if $H_2O$ and $N_2$ gas are provided to the opposite electrode, oxygen is released from the vapor and the remaining hydrogen is reacted with nitrogen to produce ammonia. For this, the temperature of the module is maintained at from 500 to 900° C., the pressure of the vapor and nitrogen gas provided is maintained at constant from air pressure to 10 atm. Oxygen ion is transported in an ionic form in a direction from the porous electrode active layer having a high oxygen partial pressure to the support having a low oxygen partial pressure (51), while the electrons transport in the opposite direction through the interconnecting portion between the support layer and the catalytic layer, i.e., the porous electrode active layer (52). As such, oxygen can be selectively transported using the present gas-separation membrane module by exchange reactions of oxygen ion in the conductive gas-separation membrane and electros in the interconnecting portion.

In one embodiment, using a porous conductive support as a cermet for the gas-separation membrane module, not only a reducing gas such as methane, but also other hydrocarbon type fuel gas such as methanol, ethanol, propane, and butane may also be used. This is due to that for example when NiO-YSZ composite is used, reducing gas is needed to reduce NiO to Ni to maintain the shape of the cermet.

The porous electrode active layer is used for coating for ionization reaction to occur $(O_2+4e^-2O^{2-})$ on its surface and maintains a porous structure for vapor to be able to diffuse to the surface of the electrolyte and get ionized.

Figure 6:
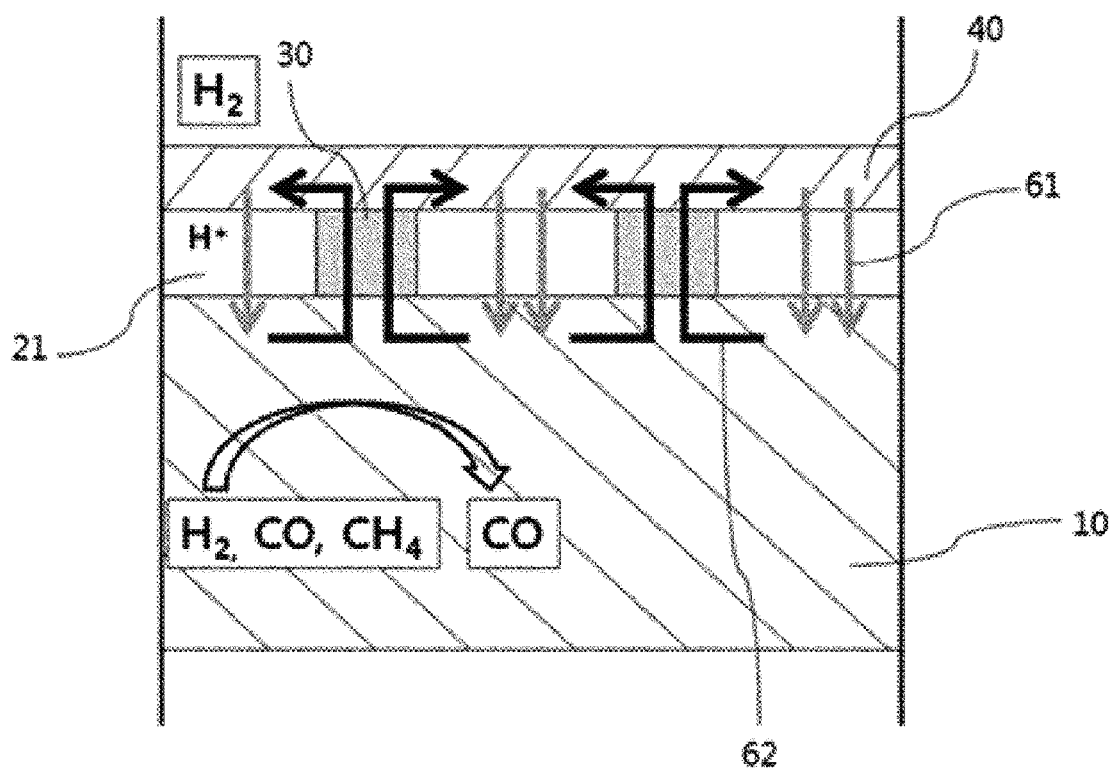
FIG. 6 is a schematic representation of a process for reforming methane gas using an electrode-supporting type gas-separation membrane module incorporating the present hydrogen separation membrane according to one embodiment.

FIG. 6 is a schematic representation of a process for reforming methane gas using an electrode-supporting type gas-separation membrane module incorporating the present hydrogen separation membrane according to one embodiment. In contact with one side of the hydrogen separation membrane (21) is the support (10) which is one of cermet, Lanthanum strontium chromit (LSCr) and Lanthanum strontium titanate (LSTi) and in contact with the other side of the separation membrane is the porous electrode active layer (40). Or a plurality of unit hydrogen separation membranes (21) are connected to each other through at least one interconnecting portion, which electrically connects the support layer and the porous electrode active layer (40).

The catalytic porous electrode active layer (40) form on top of the hydrogen separation membrane (21) and interconnecting portion (30) is electrically connected to the cermet support (10) through the interconnecting portion.

In one embodiment, methane gas as hydrocarbon comprising hydrogen, and CO is provided to the first space. Hydrogen is transported through the hydrogen separation membrane in an ionized form moving in a direction from the first space in the lower part of the module having a high hydrogen partial pressure to the second space in the upper part of the module having a low hydrogen partial pressure (61), while the electrons are transported in the same direction with the hydrogen ion through the interconnecting portion (30) between the cermet and the catalytic porous electrode active layer from the lower part of the module to the upper part of the module (62). When hydrocarbon mixture comprising hydrogen is provided to the lower part of the module, the mixture reaches to the hydrogen separation membrane via the support and the hydrogen loses an electron in the membrane to become hydrogen ion. In this case, the electron released from the hydrogen flows in the same direction as the hydrogen ion to the porous electrode active layer via the support. When the hydrogen ion is transported through the hydrogen separation membrane to the catalytic porous electrode active layer, the hydrogen ion gains an electron and becomes hydrogen gas. The produced hydrogen may be collected using methods known in the art. Also CO remains in the first space and can also be collected using methods known in the art.

In one embodiment, the thickness of the ion transport hydrogen separation membrane is 150 μm or less to achieve a high transport rate.

As such, hydrogen or oxygen can be selectively transported using the present gas-separation membrane module by exchange reactions of oxygen or hydrogen ion in the conductive gas-separation membrane and by exchange reactions electrons in the support layer. In one embodiment, the reducing gas such as methane, CO, hydrogen is injected to the first space in which the cermet, porous conductive support is present. This is due to that when for example NiO-YSZ composite is used, reducing gas is needed to reduce NiO to Ni to maintain the shape of the cermet.

The porous electrode active layer is used for coating for ionization reaction to occur ($O_2 + 4e^- 2O^{2-}$) on its surface and maintains a porous structure for oxygen to be able to diffuse to the surface of the electrolyte and get ionized.

Figure 7:
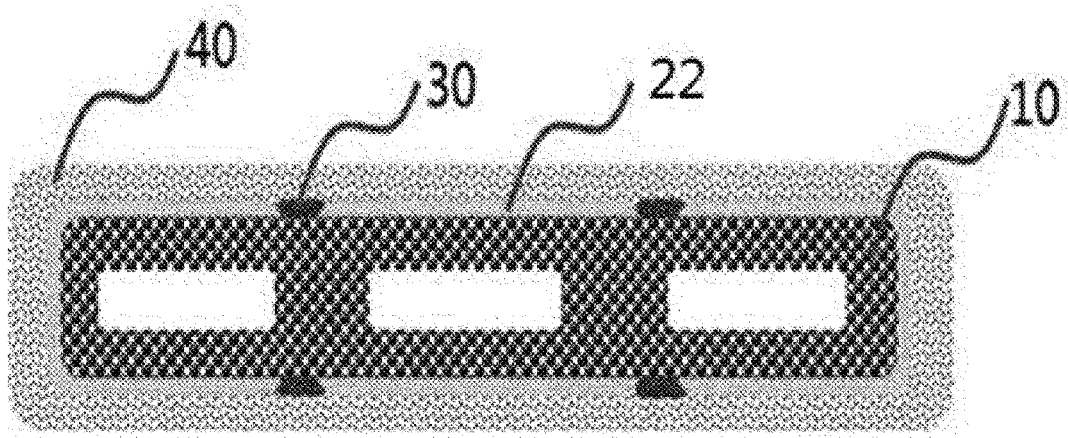
FIG. 7 is a cross sectional view of the tubular gas-separation membrane module prepared using the present conductive support according to one embodiment.

In other aspect, the present disclosure relates to a tubular module of electrode-supporting type gas-separation membrane. FIG. 7 is a cross sectional view of the tubular gas-separation membrane module prepared using the present conductive support according to one embodiment. The present tubular module comprises a tubular porous conductive support (10); a plurality of gas-separation membranes (22) positioned in contact with and on the surface of the tubular porous conductive support along the length of the support, the membranes being positioned adjacent to each other; at least one interconnecting portion (30) interposed between the gas-separation membranes and in contact with the gas-separation membranes; a porous electrode active layer (40) positioned in contact with and on the surface of the gas-separation membranes and the interconnecting portion.

The tubular porous conductive support (10) constitutes a frame of the module and also functions as a flow path for air comprising oxygen or hydrogen and is made of a nonconductive material because they connects at least two unit module. The tubular porous conductive support used in one embodiment is made of a porous metal, a composite of porous metal and oxygen separation membrane material, or electro-conductive metal oxide. The porous metal is selected from Ag, Pd, Au, and Pt. The porous metal and oxygen separation membrane material composite, cermet (Cermet) is a composite of porous metal selected from Ni, Ni-alloy, and Fe-base alloy and oxygen separation membrane material selected from yttria-stabilized zirconia, (YSZ), scandia-stabilized zirconia (ScSZ), Gd doped-ceria (GDC), Sm doped-Ceria and Lanthanum gallates, which shows a high porosity and outstanding compression strength.

Also, the electro-conductive metal oxide includes as a Perovskite type, Lanthanum strontium ferrite (LSF), Lanthanum strontium Manganite (LSM), Lanthanum strontium Chromite (LSCr), Lanthanum strontium cobalt ferrite (LSCF), and as a spinel type oxide, MnFe2O4, and NiFe2O4 and the like and thus the present support made of at least one of such materials shows a high porosity and outstanding compression strength.

In one embodiment, the gas-separation membrane (22) is an oxygen separation membrane and is made of at least one material selected from yttria-stabilized zircGd doped-ceria (GDC), Sm doped-Ceria, and Lanthanum gallates.

In one embodiment, the gas-separation membrane (20) is a hydrogen separation membrane and is made of at least one material selected from as a Perovskite type, $SrCeO_3$, $BaCeO_3$, $BaZrO_3$, $CaZrO_3$, $SrZrO_3$, and as a Pyrochlore type, $La_2Zr_2O_7$, and $La_2Ce_2O_7$.

The interconnecting portion (30) is made of a metal, or electro-conductive metal oxide having a dense structure. In one embodiment, the metal is Ag, Pd, Au, or Pt and the electro-conductive metal oxide is Lanthanum strontium ferrite (LSF), Lanthanum strontium Manganite (LSM), Lanthanum strontium Chromite (LSCr), Lanthanum strontium cobalt ferrite (LSCF) which is a Perovskite type or $MnFe_2O_4$, or $NiFe_2O_4$ which is a. spinel type.

The porous electrode active layer (40) formed on the surface of the gas-separation membrane (22) and the interconnecting portion (30) is electrically connected to the support via the interconnecting portion. The porous electrode active layer (40) is made of porous metal, cermet, or electro-conductive metal oxide with a porous structure. In one embodiment, the metal is Ag, Pd, Au, or Pt, and the cermet is a composite of a porous metal and oxygen separation membrane materials in which the porous metal is Ni, Ni-alloy, or Fe-base alloy, and the material for the gas-separation membrane is yttria-stabilized zirconia (YSZ), scandia-stabilized zirconia (ScSZ), Gd doped-ceria (GDC), Sm doped-Ceria, or Lanthanum gallates.

Also the electro-conductive metal oxide is at least one material selected from Lanthanum strontium ferrite (LSF), Lanthanum strontium Manganite (LSM), Lanthanum strontium Chromite (LSCr), Lanthanum strontium cobalt ferrite (LSCF), which is a Perovskite type, and MnFe2O4, and NiFe2O4, which is a spinel type oxide, which attributes to a high porosity.

Figure 8A:
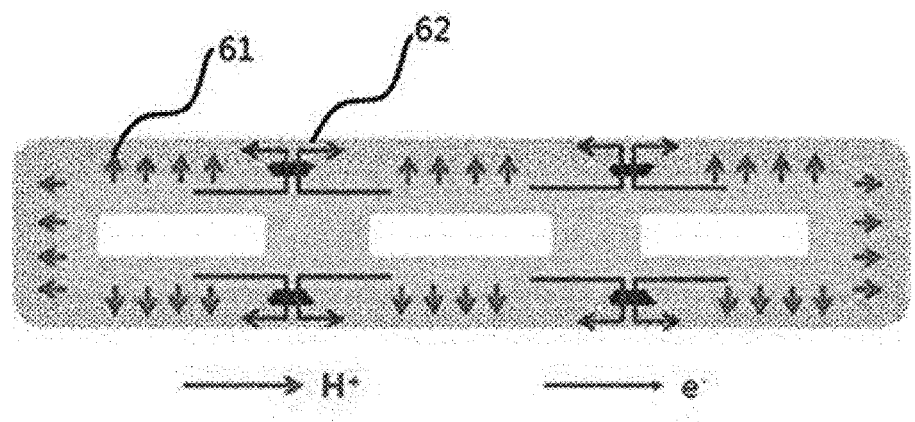
FIG. 8A is a schematic representation showing a mechanism of hydrogen ion and electron transport in the tubular gas-separation membrane module incorporating the present hydrogen separation membrane according to one embodiment.

FIG. 8A is a schematic representation showing a mechanism of hydrogen ion and electron transport in the tubular gas-separation membrane module incorporating the present hydrogen separation membrane according to one embodiment. The oxygen ion is transported through the oxygen separation membrane in anionized form in a direction from the outside of the tube having a high oxygen partial pressure to the inside having a low oxygen partial pressure (51), while the electrons flows through the interconnecting portion between the tubular porous conductive support and the catalytic porous electrode active layer in the opposite direction to the oxygen ion from the inside to the outside of the tube (52). When a mixture of gas comprising oxygen is injected to the outside of the tube, the gas mixture reaches to the oxygen separation membrane through the tubular porous conductive support and the oxygen gains electrons in the oxygen separation membrane to become oxygen ion. The oxygen ion is then transported through the oxygen separation membrane to the porous electrode active layer in which the oxygen ion release electrons and the released electrons is transported from the porous electrode active layer to the tubular porous conductive support through the interconnecting portion which is in the opposite direction to the oxygen ion transport.

Figure 8B:
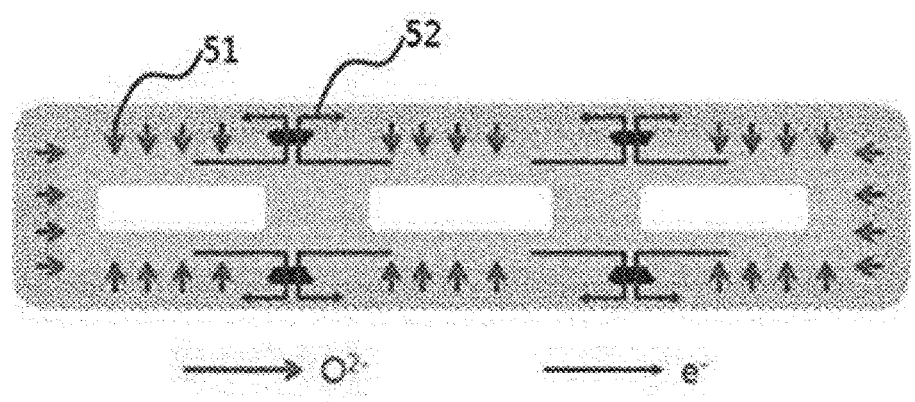
FIG. 8B is a schematic representation showing a mechanism of oxygen ion and electron transport in the tubular gas-separation membrane module incorporating the present oxygen separation membrane according to one embodiment.

FIG. 8B is a schematic representation showing a mechanism of oxygen ion and electron transport in the tubular gas-separation membrane module incorporating the present oxygen separation membrane according to one embodiment. The hydrogen ion is transported through the hydrogen separation membrane in ionized form in a direction from the inside of the tube having a high oxygen partial pressure to the outside having a low oxygen partial pressure (61), while the electrons flows through the interconnecting portion between the tubular porous conductive support and the catalytic porous electrode active layer in the same direction as the hydrogen ion from the inside to the outside of the tube (62). When a mixture of gas comprising hydrogen is injected inside of the tube, the gas mixture reaches to the hydrogen separation membrane through the tubular porous conductive support and the hydrogen loses an electron in the hydrogen separation membrane to become hydrogen ion. The released electrons are transported to the tubular porous conductive support through the interconnecting portion which is in the same direction as the hydrogen ion transport. The hydrogen ion reached to the porous electrode active layer becomes hydrogen gas by gaining electron.

In one embodiment, the mixture of gas used is a synthetic gas comprising 300~500 ppm of $CO_2$, ambient air or process gas.

The separation of oxygen and hydrogen as described above occurs in a unit electrode-supporting type gas-separation membrane module and thus the total area of the membrane for the oxygen or hydrogen separation can be increased by connecting a plurality of the unit in a tubular shape.

Figure 9:
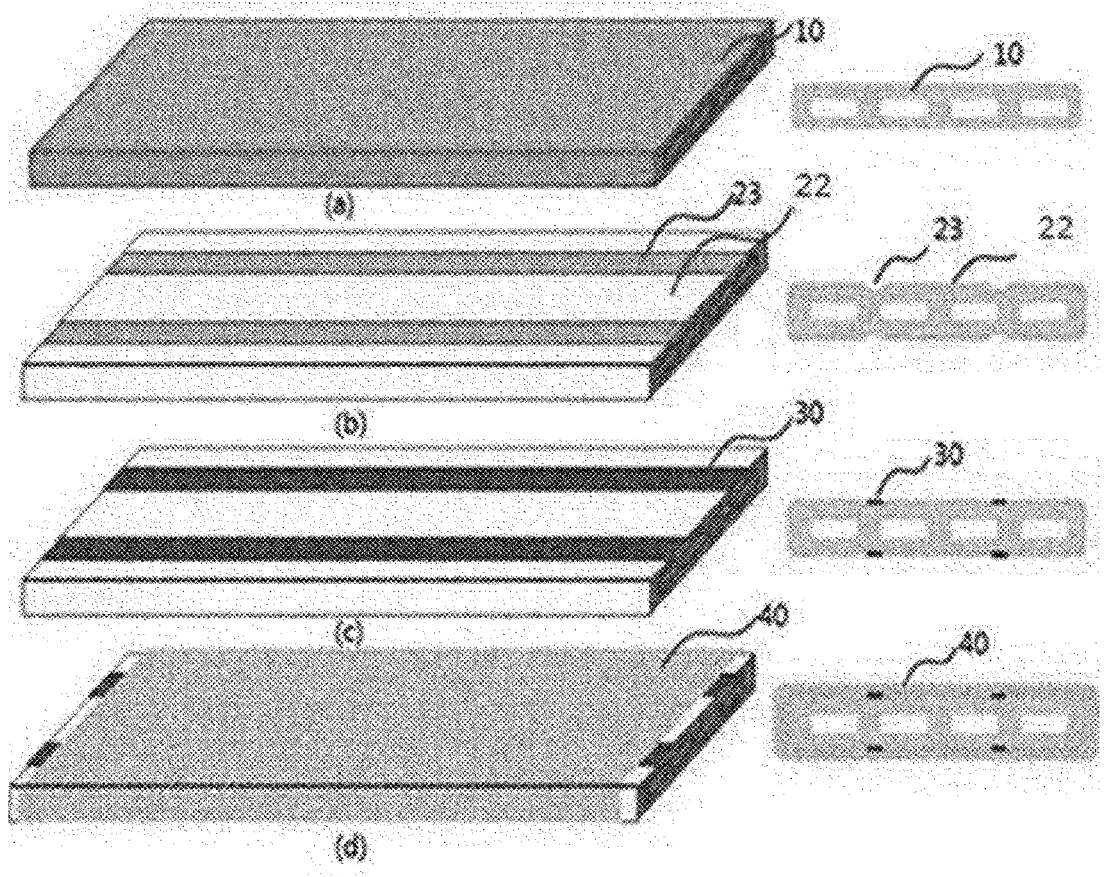
FIG. 9 is a schematic representation of a process for fabricating the tubular gas-separation membrane module according to one embodiment.

In other aspect, the present disclosure relates to a method for fabricating the electrode-supporting type gas-separation membrane module in a tubular structure. FIG. 9 is a schematic representation of a process for fabricating the tubular gas-separation membrane module according to one embodiment. The method comprises (a) a step of preparing a tubular porous conductive support (10) having a flow path formed therein through which a gas transported to the support is able to flow and collected, the tubular support being prepared by an extrusion process; (b) a step of coating the outer surface of the tubular support with a gas-separation membrane, the outer surface being masked (23) in an area that is to be coated with a interconnecting portion prior to the coating step (b); (c) a step of exposing and coating the masked areas with the interconnecting portion (30); (d) a step of heat treating the tubular support coated with the gas separation membrane and the interconnecting portion at 1200 to 1600° C.; and (e) a step of coating a porous electrode active layer on top of the tubular support coated with the gas separation membrane and the interconnecting portion.

The porous electrode active layer is used for coating for ionization reaction to occur ($O_2+4e^-2O^{2-}$) on its surface and maintains a porous structure for oxygen to be able to diffuse to the surface of the electrolyte and get ionized and to combine with electrons to produce gas.

Before coating the support with the gas-separation membrane, a masking process (23) is performed to mask the areas onto which interconnecting portion to be coated to prevent the area from being coated with the membrane. After the coating with the gas-separation membrane, the mask is removed to expose the surface of the support. Then the exposed surface is coated with interconnecting portion (30). In one embodiment, the gas-separation membrane and the interconnecting portion is coated on the support using dip-coating, screen print, or CVD. After the coating with the oxygen separation membrane and interconnecting portion, the module is heat treated at 1200 to 1600° C. to obtain a dense electrolyte layer.

The tubular porous conductive support, gas-separation membrane, interconnecting portion, and porous electrode active layer are made of materials(s) as described above.

To prepare a porous support, the method further comprises a step of adding at least one material such as carbon powder, flour, corn flour, or starch as a porous forming material which is able to form a porous by being combusted during a heat treatment process. By adding the porous forming material, additional porous may be formed in addition to the pores formed by the support by itself where the porous forming material is combusted during the heat treatment process.

In other aspect, the present disclosure also relates to method for reforming hydrocarbon using a device comprising the tubular module according to the present disclosure. The reforming methods comprises a step of providing a hydrocarbon type fuel gas maintaining a temperature at 500° C. to 900° C. to the inner surface of the tubular module of the device; and step of obtaining the synthetic gas from the outside and inside of the tubular module or the inside of the tubular module, wherein the porous conductive support is made of cermet, Lanthanum strontium chromit (LSCr) or Lanthanum strontium titanate (LSTi), In one embodiment, when reforming methane gas in short circuit membrane module utilizing oxygen ion conductive electrolyte having a tubular structure, methane($CH_4$) is used as a hydrocarbon type fuel gas and provided at air pressure. The hydrocarbon type fuel gas which is a reducing gas induces a gradient of oxygen partial pressure and provides a driven force for transport oxygen from the electrode. Thus the oxygen is transported through the separation membrane in ionized form while the electrons flow from the porous electrode active layer outside of the tube to the conductive support inside of the tube. As a result, by reforming hydrocarbon using the separation membrane, oxygen is removed from the air provided to the outside of the tube and nitrogen remains. In this case, the electric energy is not required, which lowers the cost of manufacturing the synthetic gas (example: $H_2+CO$) by reforming hydrocarbon type fuel gas. The synthesized gas may be collected from the inside of the tube using methods known in the art.

The porous electrode active layer is used for coating the electro-conductive catalytic layer for ionization reaction to occur ($O_2+4e^-2O^{2-}$) on the surface of the separation membrane and maintains a porous structure for oxygen to be able to diffuse to the surface of the electrolyte and get ionized.

In reforming hydrocarbon using the tubular module of electrode-supporting type gas-separation membrane of the present disclosure, multi-component coupling reactions are possible by injecting gas such as $CO_2$, $H_2O$, $N_2$ and the like inside of the tube. While the oxygen is released, reducing gas such as CO, $H_2$, $NH_3$ and the like is able to be produced in the electrode at the opposite side at the same time. The separation membranes using the conventional mixed conductive materials or composites of ion and proton conductive oxide are decomposed under the reducing atmosphere or undergo phase changes so that they cannot be used for gas separation process under the condition as described above.

In reforming hydrocarbon using separation membrane module, methane used as a fuel gas is a reducing gas so that it causes a gradient of oxygen partial pressure which drives the oxygen transport from the electrode in the opposite side. In one embodiment, when reforming natural gas using the tubular module of electrode-supporting type gas-separation membrane of the present disclosure, by injecting $H_2O$ and $N_2$ inside of the tube, the oxygen is released from the vapor and the remaining hydrogen is reacted with nitrogen to produce ammonia, which may be collected using the methods known in the art. For the process, the temperature of the module is maintained at 500 to 900° C., and the pressure of the nitrogen and vapor provided is maintained at the constant level between air pressure and 10 atm. The oxygen ion is transported through the oxygen separation membrane in an ionized form moving in a direction from the porous electrode active layer at the outside of the tube having a high oxygen partial pressure to the support at the inside of the tube having a low oxygen partial pressure, while the electrons are transported through the interconnecting portion in the opposite direction of the oxygen ion transport. As such, the gas-separation membrane module is able to selectively transport oxygen by exchanges of oxygen ion via the gas-separation membrane and exchange reaction of electrons via the interconnecting portion. Particularly when the cermet is used as a tubular conductive support, not only a reducing gas, methane, but also other hydrocarbon type fuel gas such as methanol, ethanol, propane, or butane and the like may also be used. This is due to that when for example NiO-YSZ composite is used, reducing gas is needed to reduce NiO to Ni to maintain the shape of the cermet.

The porous electrode active layer is used for coating for ionization reaction to occur ($O_2+4e^-2O^{2-}$) on its surface and maintains a porous structure for oxygen to be able to diffuse to the surface of the electrolyte and get ionized.

In one embodiment, the tubular porous support is one of cermet, Lanthanum strontium chromit (LSCr) and Lanthanum strontium titanate (LSTi). In reforming hydrocarbon comprising methane ($CH_4$), gas such as methane is permeated to the porous support and it helps to reform the synthetic gas by the oxygen transport through the separation membrane. The cermet is fabricated by press or extrusion process using metal oxide such as NiO-YSZ, NiO-GDC, NiO-SDC, NiO—CeO and the like and electrolytes to produce porous composite support. To prepare the porous support, carbon powder, flour, corn flour, or starch and the like may be added as a porous forming material which is able to form a porous by being combusted during a heat treatment process. The ion transport separation membrane layer such as YSZ, doped-$CeO_2$ is coated on the support and the area which is to be coated with interconnecting portion is masked beforehand. The coating may be performed by dip-coating, screen print, CVD and the like. For coating with the electro-conductive interconnecting portion having a dense structure, the masked areas are unmasked and coated with the electro-conductive interconnecting portion such as (La,Sr)$MnO_3$, (La,Sr)$FeO_3$ and heat treated at 1200 to 1600° C. to produce a dense electrolyte layer.

In other embodiment, in the process of reforming methane gas using gas-separation membrane module employing proton conductive electrolyte, as a hydrocarbon, methane gas comprising hydrogen and CO is injected inside of the tube. The hydrogen ion is transported through the hydrogen separation membrane in ionized form in a direction from the inside of the tube having a high hydrogen partial pressure to the outside having a low hydrogen partial pressure, while the electrons flows through the interconnecting portion between the tubular porous conductive support and the catalytic porous electrode active layer in the same direction as the hydrogen ion from the inside to the outside of the tube. When the hydrocarbon mixture comprising hydrogen is injected outside of the tube, the gas mixture reaches to the hydrogen separation membrane through the support for example the cermet, and the hydrogen loses an electron in the hydrogen separation membrane to become hydrogen ion. The released electrons are then transported to the porous electrode active layer in the outside of the tube through the support inside of the tube which is the same direction as the hydrogen ion transport. The hydrogen ion reached to the porous electrode active layer through the hydrogen separation membrane becomes hydrogen gas by gaining electron, which may be collected using the methods known in the art. Also CO remained inside of the tube also be collected using the methods known in the art.

In one embodiment, the thickness of the ion transport hydrogen separation membrane is 150 μm or less to achieve a high transport rate.

As such, hydrogen or oxygen can be selectively transported using the present gas-separation membrane module by exchange of oxygen or hydrogen ion in the conductive gas-separation membrane and by exchange reaction of electrons in the support layer. In one embodiment, the reducing gas such as methane, CO, hydrogen is injected to the outside of the tube in which the cermet, porous conductive support is present. This is due to that when for example NiO-YSZ composite is used, reducing gas is needed to reduce NiO to Ni to maintain the shape of the cermet.

The porous electrode active layer is used for coating for ionization reaction to occur ($O_2+4e^-2O^{2-}$) on its surface and maintains a porous structure for oxygen to be able to diffuse to the surface of the electrolyte and get ionized.

With respect to the use of substantially any plural and/or singular terms herein, those having skill in the art can translate from the plural to the singular and/or form the singular to the plural as is appropriate to the context and/or application. The various singular/plural permutations may be expressly set forth herein for sake of clarity.

BRIEF DESCRIPTION OF NUMERALS

10. Conductive support
20. Oxygen separation membrane
21. Hydrogen separation membrane
22. Gas-separation membrane
23. Masking area
30. Interconnecting portion
40. Porous electrode active layer
51. Oxygen ion flux
52. Electron flux through the oxygen separation membrane
61. Hydrogen ion flux

What is claimed is:

1. An electrode-supporting type gas-separation membrane module comprising:
   a porous support;
   a plurality of gas-separation membranes positioned in contact with and on top of the porous support, the membranes being positioned adjacent to each other;
   at least one interconnecting portion interposed between the gas-separation membranes abutting the gas-separation membranes; and
   a porous electrode active layer positioned in contact with and on the top of the gas-separation membranes and the interconnecting portion,
   wherein the porous support is a metal, a cermet, or an electro-conductive metal oxide, wherein the metal is selected from the group consisting of Ni, Ni-alloy, and Fe-base alloy, the electro-conductive metal oxide is selected from the group consisting of Lanthanum strontium ferrite (LSF), Lanthanum strontium cobalt ferrite (LSCF), which are a Perovskite type, $MnFe_2O_4$, and $NiFe_2O_4$, which are a spinel type, and
   the cermet is a composite of an ion conductive electrolyte material and a material selected from the group consisting of Ni, Ni-alloy, and Fe-base alloy, wherein the ion conductive electrolyte is made of at least one material selected from the group consisting of scandia-stabilized zirconia (ScSZ), Gd doped-ceria (GDC), Sm doped-Ceria, Lanthanum gallates, $SrCeO_3$, $BaCeO_3$, $BaZrO_3$, $CaZrO_3$, $SrZrO_3$, $La_2Zr_2O_7$, and $La_2Ce_2O_7$, and the gas membrane is made of the same material as the ion conductive electrolyte comprised in the cermet, wherein the gas separation membranes are for separating oxygen or hydrogen, wherein the gas separation membranes for oxygen are made of scandia-stabilized zirconia (ScSZ), Gd doped-ceria (GDC), Sm doped-Ceria, or Lanthanum gallates, and the gas separation membranes for hydrogen are made of one selected from $SrCeO_3$, $BaCeO_3$, $BaZrO_3$, $CaZrO_3$, and $SrZrO_3$, which are a Perovskite type, or from $La_2Zr_2O_7$ and $La_2Ce_2O_7$, are a Pyrochlore type, and wherein the interconnecting portion is a metal or an electro-conductive metal oxide of a dense structure, wherein the metal is Ag, Pd, Au, or Pt, and the electro-conductive metal oxide is selected from Lanthanum strontium ferrite (LSF) and Lanthanum strontium cobalt ferrite (LSCF), which are a Perovskite type, or from $MnFe_2O_4$ and $NiFe_2O_4$, which are a spinel type.

2. The module of claim 1, wherein the porous electrode active layer is a porous metal, a cermet, or an electro-conductive metal oxide, wherein the porous metal is Ni, Ni-alloy, or Fe-base alloy; the electro-conductive metal oxide is selected from Lanthanum strontium ferrite (LSF), and Lanthanum strontium cobalt ferrite (LSCF), which are a Perovskite type, or from $MnFe_2O_4$ and $NiFe_2O_4$, which are a spinel type.

3. A method for reforming hydrocarbon using a device comprising the module according to claim 1, wherein the device comprises a first and a second space which are defined by the membrane module interposed between the spaces, and the porous support comprised in the module is made of cermet or Lanthanum strontium titanate (LSTi), the method comprising:
providing a hydrocarbon type fuel gas maintaining at the temperature of 500° C. to 900° C. to the first space such that the gas touches one side of the membrane module, and
obtaining synthetic gas from the first and second space or the first space.

4. The method of claim 3, further comprising before the obtaining step a step of supplying an air at 1 to 10 atm to the second space such that the gas touches the other side of the membrane module.

5. The method of claim 3, wherein the hydrocarbon is a methane gas ($CH_4$), and the synthetic gas is a mixture of $H_2$ and CO.

6. The method of claim 3, wherein the hydrocarbon is a methane gas comprising CO and $H_2$, the synthetic gas obtained from the first space is CO, and the synthetic gas obtained from the second space is $H_2$.

7. A tubular module of electrode-supporting type gas-separation membrane comprising:
a tubular porous electro-conductive support;
a plurality of gas-separation membranes positioned in contact with and on top of the tubular porous conductive support along the length of the support, the membranes being positioned adjacent to each other;
at least one interconnecting portion interposed between the gas-separation membranes in contact with the gas-separation membranes; and
a porous electrode active layer positioned in contact with and on the top of the gas-separation membranes and the interconnecting portion,
wherein the tubular porous conductive support is a metal, a cermet, or an electro-conductive metal oxide, wherein the metal is Ni, Ni-alloy, or Fe-base alloy, the electro-conductive metal oxide is Lanthanum strontium ferrite (LSF) or Lanthanum strontium cobalt ferrite (LSCF), which is a Perovskite type, or $MnFe_2O_4$ or $NiFe_2O_4$, which is a spinel type,
the cermet is a composite of one of Ni, Ni-alloy or Fe-base alloy and an ion transport electrolyte, wherein the ion transport electrolyte is at least one of scandia-stabilized zirconia (ScSZ), Gd doped-ceria (GDC), Sm doped-Ceria, Lanthanum gallates, $SrCeO_3$, $BaCeO_3$, $BaZrO_3$, $CaZrO_3$, $SrZrO_3$, $La_2Zr_2O_7$, and $La_2Ce_2O_7$, and the gas membrane is made of the same material as the ion transport electrolyte comprised in the cermet, and
wherein the gas separation membranes are for separating oxygen or hydrogen, wherein the gas separation membranes for oxygen are made of scandia-stabilized zirconia (ScSZ), Gd doped-ceria (GDC), Sm doped-Ceria, or Lanthanum gallates, and the gas separation membranes for hydrogen are made of $SrCeO_3$, $BaCeO_3$, $BaZrO_3$, $CaZrO_3$, or $SrZrO_3$, which is a Perovskite type, or $La_2Zr_2O_7$ or $La_2Ce_2O_7$, which is a pyrochlore type.

8. The tubular module of claim 7, wherein the interconnecting portion is a metal or an electro-conductive metal oxide having a dense structure, wherein the metal is Ag, Pd, Au, or Pt, the electro-conductive metal oxide is Lanthanum strontium ferrite (LSF), or Lanthanum strontium cobalt ferrite (LSCF), which is a perovskite type, or $MnFe_2O_4$ or $NiFe_2O_4$, which is a spinel type,
wherein the porous electrode active layer is a porous metal, a cermet, or an electro-conductive metal oxide,
wherein the porous metal is Ni, Ni-alloy, or Fe-base alloy, and the electro-conductive metal oxide is Lanthanum strontium ferrite (LSF) or Lanthanum strontium cobalt ferrite (LSCF), which is a perovskite type, or $MnFe_2O_4$ or $NiFe_2O_4$, which is a spinel type, and
the cermet is a composite of one of Ni, Ni-alloy, and Fe-base alloy and an ion transport electrolyte, wherein the ion transport electrolyte is at least one of scandia-stabilized zirconia (ScSZ), Gd doped-ceria (GDC), Sm doped-Ceria, Lanthanum gallates, $SrCeO_3$, $BaCeO_3$, $BaZrO_3$, $CaZrO_3$, $SrZrO_3$, $La_2Zr_2O_7$, and $La_2Ce_2O_7$, and the gas membrane is made of the same material as the ion transport electrolyte comprised in the cermet.

9. A method for fabricating the tubular module of electrode-supporting type gas-separation membrane according to claim 7, comprising:
preparing a tubular porous conductive support having a flow path formed therein through which a gas transported into the support is able to move and collected, the tubular support being prepared by an extrusion process;
coating the outer surface of the tubular support with a gas-separation membrane wherein the outer surface being masked in areas that is to be coated with a interconnecting portion prior to the coating,
exposing the masked area and coating the unmasked areas with the interconnecting portion;
heat treating the tubular support coated with the gas separation membrane and the interconnecting portion at 1200 to 1600° C.; and
coating the surface of the gas separation membrane and the interconnecting portion with a porous electrode active layer,
wherein the tubular porous conductive support is a metal, a cermet, or an electro-conductive metal oxide, wherein the metal is Ni, Ni-alloy, or Fe-base alloy; the electro-conductive metal oxide is Lanthanum strontium ferrite (LSF) or Lanthanum strontium cobalt ferrite (LSCF), which is a perovskite type, or $MnFe_2O_4$ or $NiFe_2O_4$, which is a spinel type of oxide; and the cermet is a composite of one of Ni, Ni-alloy and Fe-base alloy and an ion transport electrolyte, wherein the ion transport electrolyte is at least one of scandia-stabilized zirconia (ScSZ), Gd doped-ceria (GDC), Sm doped-Ceria, Lanthanum gallates, $SrCeO_3$, $BaCeO_3$, $BaZrO_3$, $CaZrO_3$, $SrZrO_3$, $La_2Zr_2O_7$, and $La_2Ce_2O_7$, and the gas membrane is made of the same material as the ion transport electrolyte comprised in the cermet, wherein the gas separation membrane is for separating oxygen or hydrogen, the oxygen separating membrane is made of scandia-stabilized zirconia (ScSZ), Gd doped-ceria (GDC), Sm doped-Ceria, or Lanthanum gallates, the hydrogen separation membrane is made of $SrCeO_3$, $BaCeO_3$, $BaZrO_3$, $CaZrO_3$, or $SrZrO_3$, which are a Perovskite type, $La_2Zr_2O_7$, or $La_2Ce_2O_7$ which are a pyrochlore type, and wherein the interconnecting portion is a metal or an electro-conductive metal oxide having a dense structure, the metal is Ag, Pd, Au, or Pt, the electro-conductive metal oxide is Lanthanum strontium ferrite (LSF), or Lanthanum strontium cobalt ferrite (LSCF), which are a perovskite type, or $MnFe_2O_4$, or $NiFe_2O_4$, which are a spinel type oxide.

10. The method of claim 9, wherein the porous electrode active layer is a porous metal, a cermet, or an electro-conductive metal oxide, wherein the porous metal is Ni, Ni-alloy, or Fe-base alloy; the electro-conductive metal oxide is Lanthanum strontium ferrite (LSF) or Lanthanum strontium cobalt ferrite (LSCF), which is a perovskite type, or $MnFe_2O_4$ or $NiFe_2O_4$, which is a spinel type oxide.

11. The method of claim 10, wherein the cermet is a composite of one of Ni, Ni-alloy and Fe-base alloy and an ion transport electrolyte, the ion transport electrolyte is at least one of scandia-stabilized zirconia (ScSZ), Gd doped-ceria (GDC), Sm doped-Ceria, Lanthanum gallates, $SrCeO_3$, $BaCeO_3$, $BaZrO_3$, $CaZrO_3$, $SrZrO_3$, $La_2Zr_2O_7$, and $La_2Ce_2O_7$, and the gas membrane is made of the same material as the ion transport electrolyte comprised in the cermet.

12. A method for reforming hydrocarbon using a device comprising the tubular module according to claim 7, wherein the porous conductive support is made of cermet, or Lanthanum strontium titanate (LSTi), the method comprising:

providing a hydrocarbon type fuel gas maintaining a temperature at 500° C. to 900° C. to the inside of the tubular module of the device such that the gas provided is in contact with the surface inside of the tubular module; and obtaining the synthetic gas from the outside and inside of the tubular module or the inside of the tubular module.

13. A method of claim 12, further comprising a step, before the obtaining step, of supplying an air at 1 to 10 atm to the outside of the device such that the air provided is in contact with the surface outside of the module.

* * * * *